(12) United States Patent
Frisken et al.

(10) Patent No.: US 7,136,786 B2
(45) Date of Patent: Nov. 14, 2006

(54) METHOD AND SYSTEM FOR MODELING INTERACTION OF OBJECTS

(75) Inventors: Sarah F. Frisken, Cambridge, MA (US); Ronald N. Perry, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 835 days.

(21) Appl. No.: 09/833,515

(22) Filed: Apr. 12, 2001

(65) Prior Publication Data

US 2002/0149603 A1 Oct. 17, 2002

(51) Int. Cl.
G06F 17/10 (2006.01)

(52) U.S. Cl. .............................. 703/2; 703/6; 345/419; 345/420; 345/421; 345/422; 345/474

(58) Field of Classification Search ................ 703/2, 703/6; 345/420, 422
See application file for complete search history.

(56) References Cited

U.S. PATENT DOCUMENTS

| | | | | | |
|---|---|---|---|---|---|
| 5,579,455 | A | * | 11/1996 | Greene et al. ............... | 345/422 |
| 5,701,403 | A | * | 12/1997 | Watanabe et al. ........... | 345/419 |
| 6,111,582 | A | * | 8/2000 | Jenkins ........................ | 345/421 |
| 6,480,205 | B1 | * | 11/2002 | Greene et al. ............... | 345/631 |
| 6,512,999 | B1 | * | 1/2003 | Dimas et al. ................ | 703/9 |
| 6,552,722 | B1 | * | 4/2003 | Shih et al. ................... | 345/419 |
| 6,684,255 | B1 | * | 1/2004 | Martin ......................... | 709/231 |
| 6,704,694 | B1 | * | 3/2004 | Basdogan et al. ............. | 703/4 |
| 6,714,201 | B1 | * | 3/2004 | Grinstein et al. ........... | 345/474 |
| 6,792,398 | B1 | * | 9/2004 | Handley et al. ............... | 703/2 |
| 6,867,770 | B1 | * | 3/2005 | Payne ......................... | 345/420 |
| 2002/0130857 | A1 | * | 9/2002 | Perry et al. .................. | 345/420 |
| 2002/0130859 | A1 | * | 9/2002 | Perry et al. .................. | 345/420 |
| 2002/0133321 | A1 | * | 9/2002 | Perry et al. .................... | 703/2 |
| 2002/0149580 | A1 | * | 10/2002 | Perry et al. .................. | 345/419 |
| 2002/0149582 | A1 | * | 10/2002 | Pope et al. .................. | 345/420 |
| 2004/0125103 | A1 | * | 7/2004 | Kaufman et al. ........... | 345/419 |

OTHER PUBLICATIONS

"Adaptive Sampling of Implicit Surfaces for interactive Modeling and Animation", M. Desbrun et al, iMAFIS Institut Polytechniqude Gernoble, Feb. 2001.*
"Integrating symbolic images into a multimedia database system using classification and abstraction approaches", A. Soffer et al, The VLDB Journal (1998) 7: 253–274, 1998.*
"Incremental 3D Collision Detection with Hierarchical Data Structures", T.Y. Li, VRST 98', ACM 1-58113-091-8/98/0011, 1998.*

(Continued)

Primary Examiner—Jean R. Homere
Assistant Examiner—Fred Ferris
(74) Attorney, Agent, or Firm—Dirk Brinkman; Andrew J. Curtin (57) ABSTRACT

A method is described for modeling interactions between models. A first adaptively sampled distance field having a first spatial hierarchy for a first model is generated, and a second adaptively sampled distance field having a second spatial hierarchy for a second model is generated. During each time step, a potential overlap region is determined using the spatial hierarchies of the first and second adaptively sampled distance fields. When the potential overlap region is non-empty, a third adaptively sampled distance field is generated from the first and second adaptively sampled distance fields using a first interaction procedure and first properties and a fourth adaptively sampled distance field is generated from the first and second adaptively distance fields using a second interaction procedure and second properties to model the interactions between the first and second models.

17 Claims, 6 Drawing Sheets

OTHER PUBLICATIONS

Frisken et al., "Adaptively Sampled Distance Fields: A General Representation of Shape for Computer Graphics", Proceedings for SIGGRAPH 2000, pp. 249–254, 2000.

Desbrun et al., "Animating Soft Substances with Implicit Surfaces"; Proceedings for SIGGRAPH '95, pp. 287–290, 1995.

Marie–Paule Cani–Gascuel, "Layered Deformable Models with Implicit Surfaces"; Proceedings for Graphics Interface '98, pp. 201–208, 1998.

Hoff et al., "Fast and Simple 2D Geometric Proximity Queries Using Graphics Hardware"; Proc. Interactive 3D Graphics '01, 2001.

Lin et al., "*Collision detection Between geometric models: a survey,*" Proc. IMA Conference on Mathematics of Surfaces, 1998.

Gibson et al., "*A survey of deformable modeling in computer graphics,*" MERL Technical Report, TR97–19, 1997.

Witkin et al., "An introduction to physically based modeling", SIGGRAPH Course Notes 32, ACM SIGGRAPH, 1994.

Frisken–Gibson, "*Using linked volumes to model object collisions, deformation, cutting, carving, and joining,*" IEEE TVCG, pp. 333–348.

* cited by examiner

METHOD AND SYSTEM FOR MODELING INTERACTION OF OBJECTS

FIELD OF THE INVENTION

The present invention relates generally to the field of computer graphics, and particularly to collision detection and model interaction.

BACKGROUND OF THE INVENTION

While there has been significant progress in simulating collisions between rigid bodies, much remains to be done for modeling interactions between soft bodies, see Lin et al., "Collision detection between geometric models: a survey," Proc. IMA Conference on Mathematics of Surfaces, 1998. Graphical techniques for representing and deforming soft bodies range from non-physical, e.g., control point-based, to physically plausible, e.g., free form deformation (FFD), to physically realistic, e.g., finite element methods (FEM), see Gibson et al., "A survey of deformable modeling in computer graphics," MERL Technical Report, TR97-19, 1997.

All of these techniques require three basic operations to model interactions between soft bodies: 1) detecting collisions between deformable bodies, 2) computing impact forces when the bodies collide, and 3) determining deformation forces or contact deformation of the bodies to initialize a deformation procedure.

It is desired to perform all three operations quickly, with efficient use of memory, and more accurately than known methods. In addition, it is desired that the results of these operations can be used by any of the know deformation techniques stated above.

SUMMARY OF THE INVENTION

The present invention provides a method for modeling interactions between models. A first adaptively sampled distance field having a first spatial hierarchy for a first model is generated, and a second adaptively sampled distance field having a second spatial hierarchy for a second model is generated.

During each time step, a potential overlap region is determined using the spatial hierarchies of the first and second adaptively sampled distance fields.

When the potential overlap region is non-empty, a third adaptively sampled distance field is generated from the first and second adaptively sampled distance fields using a first interaction procedure and first properties and a fourth adaptively sampled distance field is generated from the first and second adaptively distance fields using a second interaction procedure and second properties to model the interactions between the first and second models.

DETAILED DESCRIPTION OF THE PREFERRED EMBODIMENT

Introduction

We have recently described adaptively sampled distance fields (ADFs) as a data structure for representing shape, and indicated that ADFs might also be useful for collision detection, see Frisken et al. "Adaptively sampled distance fields: a general representation of shape for computer graphics," Proc. SIGGRAPH'00, pp. 249–254, 2000, also see U.S. patent application Ser. No. 09/370,091 "Detail-Directed Distance Fields" filed by Frisken et al. on Aug. 6, 1999, incorporated herein in its entirety by reference. ADF methods adaptively sample a signed distance field of an object and store the sample values in a spatial hierarchy, e.g., a sparse octree, for fast processing. Methods that can operate on ADFs are described in: U.S. patent applications Ser. No. 09/810,983 "System and Method for Generating Adaptively Sampled Distance Fields with Bounded Distance Trees" filed by Perry et al. on Mar. 16, 2001, U.S. patent application Ser. No. 09/810,839 "Conversion of Adaptively Sampled Distance Fields to Triangles" filed by Frisken et al. on Mar. 16, 2001, U.S. patent application Ser. No. 09/811,010 "System and Method for Modeling Graphics Objects" filed by Perry et. al. on Mar. 16, 2001, and U.S. patent application 09/809,682 "System and Method for Converting Range Data to 3D Models," filed by Frisken et al. on Mar. 16, 2001.

Here, we describe a system and method where ADFs are used to model the interaction between deformable objects. ADFs have several advantages for modeling impacts between objects. These advantages overcome problems present in prior art modeling systems. These advantages include compact representations of complex surfaces, direct inside/outside and proximity tests, fast localization of potential contact regions, more accurate representation of the overlap region, and methods for computing material-dependent contact deformation.

System Overview

Figure 1:
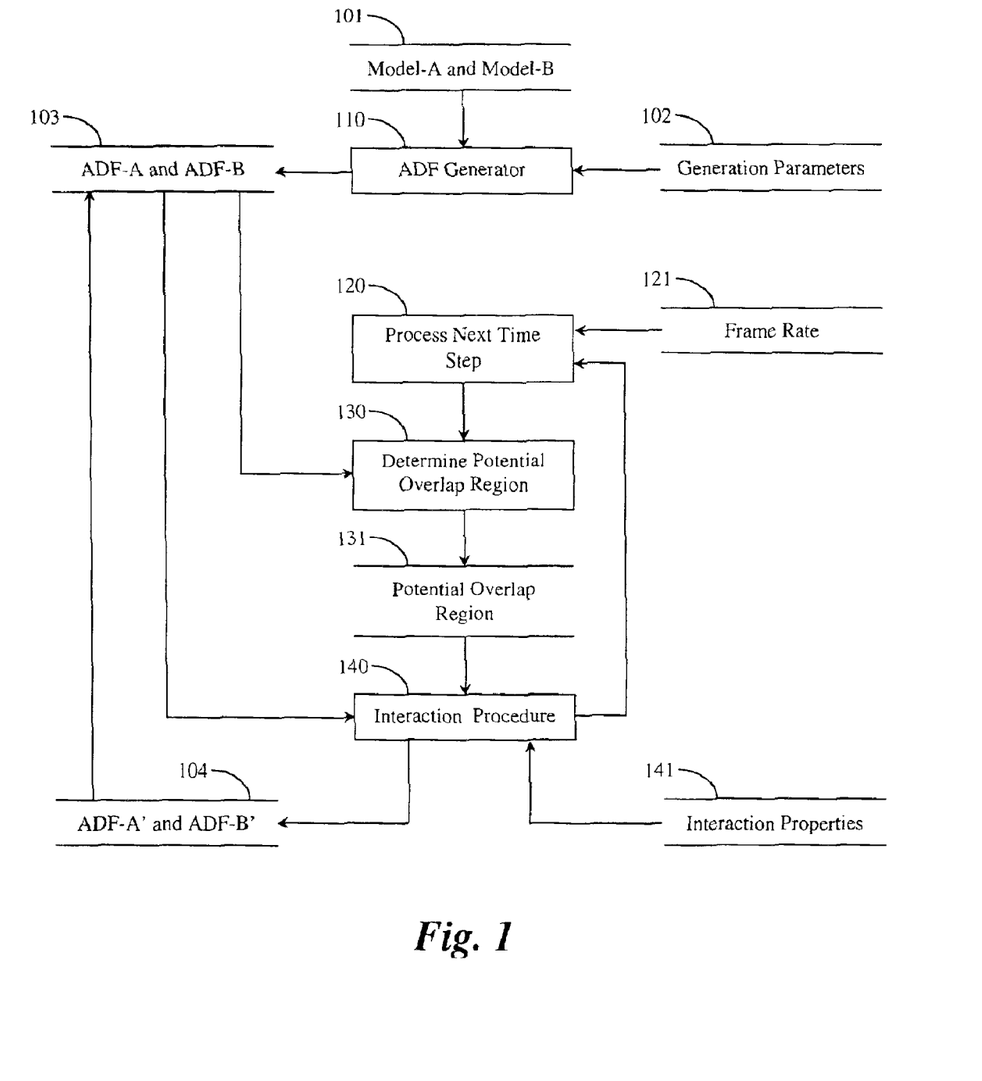
FIG. 1 is a flow diagram of a method and system for modeling interactions between deformable objects according to the invention.

FIG. 1 shows our method and system 100 for modeling physical interactions using adaptively sampled distance fields. In the most general case, the input to the method 100 includes at least two models 101 representing graphics objects or physical systems, and generation parameters 102. The input models 101 can be constructed using any known modeling technique. For example, the models can be in the form of range images, point clouds, triangle meshes, or implicit functions.

Because the models can be in many forms, our method is particularly suited for animation and physical modeling where many different model forms are often used in conjunction depending on production cost and time requirements, and available technologies. As an advantage, the models 101 can uses different representations. For example, one model can be derived from range images, and the other model can be in the form of a polygon mesh.

In step 110, ADF-A and ADF-B 103 are generated 115 according to the generation parameters 102. For example, the generation parameters 102 can specify a level-of-detail, or an acceptable error measure.

Step 120 indicates a next processing step, in time, as the models move relative to each other. For real-time modeling, the time steps can correspond to a frame rate 121, e.g., 30 frames per second. For real-world physical simulations, for example, atomic interactions, or climatic and astronomic simulation, the time steps can range from fractional seconds to years or light-years.

Detecting Collisions, Penetration, and Proximity

Step 130 determines the relative position of the models with respect to each other. More specifically, a determination is made whether any portions of the models 103 overlap each other. The sign of the distance values reconstructed from the ADFs 103, at any point in space, provides a convenient inside/outside test.

The spatial data structures of the ADFs can be exploited to quickly locate a potential region of overlap 131. For example, if the spatial data structures of the ADFs are octrees, bounding boxes of the octree cells can be intersected to determine the overlapping region. If the overlapping region is non-empty, a potential collision has occurred.

In addition to the bounding boxes of the ADF cells, the distance values at the root cell of the ADF, and subsequent children cells of the root cell in the hierarchy of the ADF, can be used to exclude the possibility that objects are interacting.

For example, if the distance values at the root cell of an object A indicate that the nearest surface of object A is 2 units away, and the distance values at the root cell of an object B indicate that the nearest surface of object B is also 2 units away, and the measure of overlap between the root cells of object A and object B is very small, say ⅛ of a unit, then the present invention can conclude no interaction between object A and object B can occur.

This is an advantage of the present invention and unlike the prior art methods where distance information is not available. The use of distance values to exclude the possibility that objects are interacting can be used at any level in the ADF spatial hierarchy, not just at the root cell. When there are thousands of objects in a scene interacting, this advantage of the invention can dramatically reduce the processing time required.

In the case where the overlapping region 131 is non-empty during the current time step 120, an interaction procedure 140 is invoked to produce ADF-A' and ADF-B' 104 using interaction properties 141.

The interaction procedure 140 can be a deformation procedure, in which case, ADF-A' and ADF-B' 104 are deformations of ADF-A and ADF-B 103, and the interaction properties 141 are material properties. Then, ADF-A' and ADF-B' 104, the deformed shapes of ADF-A and ADF-B 103, can be used in the next time step, or they can be used as initial deformations of the models in a physical simulator.

Figure 2A:
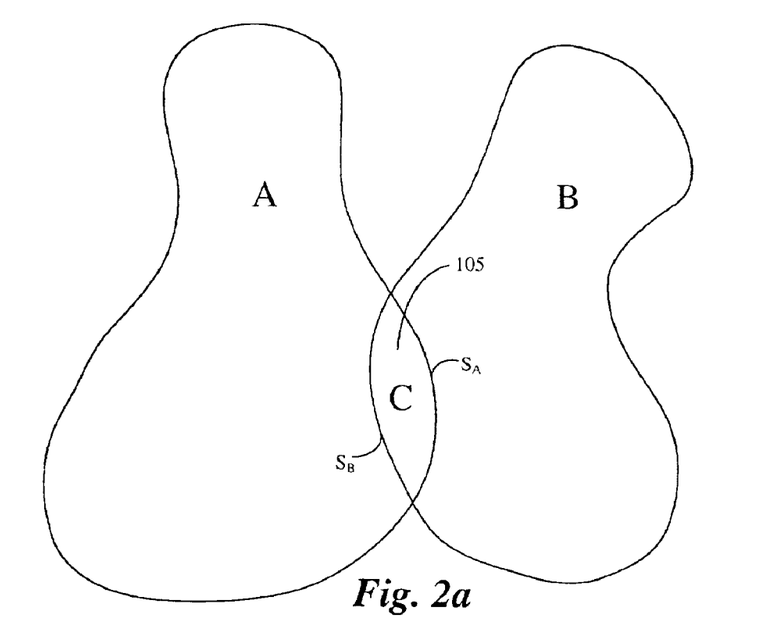
FIG. 2a is a diagram of a physical interaction between two deformable objects.

In one embodiment as shown in FIG. 2a, the interaction procedure 140 is an identity procedure, and an intersection ADF, ADF-C 105, is generated. Interaction forces acting on the intersection ADF ADF-C 105 can be determined, as described below.

Figure 2B:
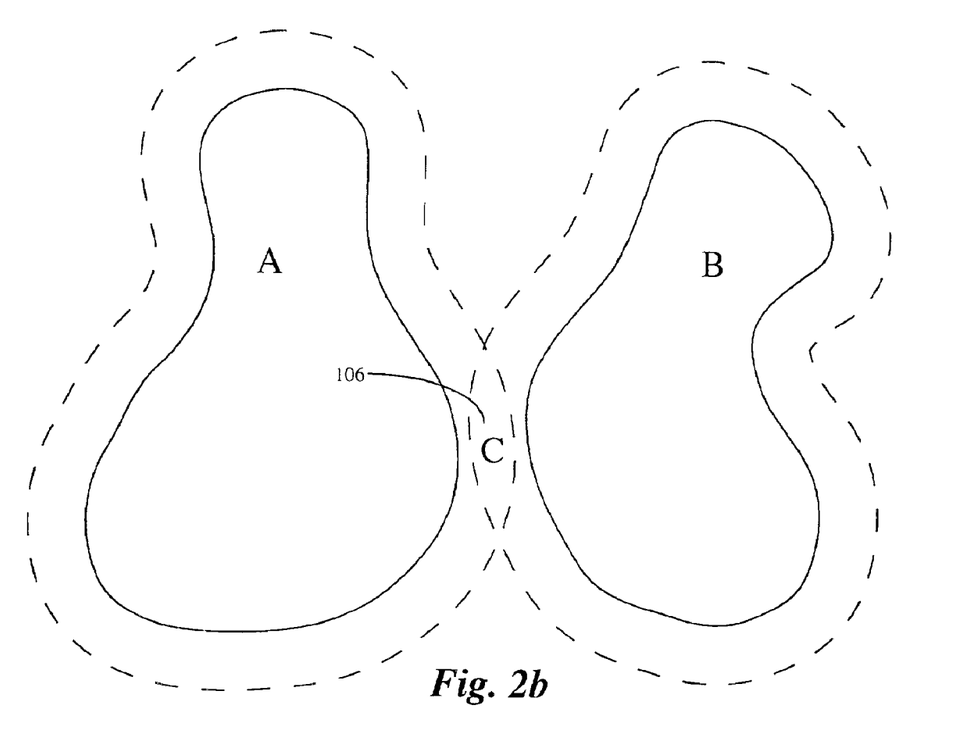
FIG. 2b is a diagram of a proximity interaction between two deformable objects.

To determine proximity of the two models, the intersection ADF ADF-C 106 can be generated from offset surfaces as shown in FIG. 2b. In this case, the models interact with each other even though they do not physically overlap. For example, for certain interaction properties, such as force fields, the models can interact with each other at a distance, prior to physical contact.

Determining Forces

There are a number of methods for determining the forces acting on two bodies depending on the interaction properties 141, see Witkin et al., "*An introduction to physically based modeling*", SIGGRAPH Course Notes 32, ACM SIGGRAPH, 1994.

Penalty-based methods determine the forces based on how far objects penetrate each other during a discrete time step. Distance fields have been used to determine penetration depth at sample points along the penetrating surface as well as to compute contact forces, see Frisken-Gibson, "*Using linked volumes to model object collisions, deformation, cutting, carving, and joining,*" IEEE TVCG, pp. 333–348, 1999, and Hoff et al., "*Fast and simple 2D geometric proximity queries using graphics hardware,*" Proc. Interactive 3D Graphics'01 , 2001.

Figure 3:
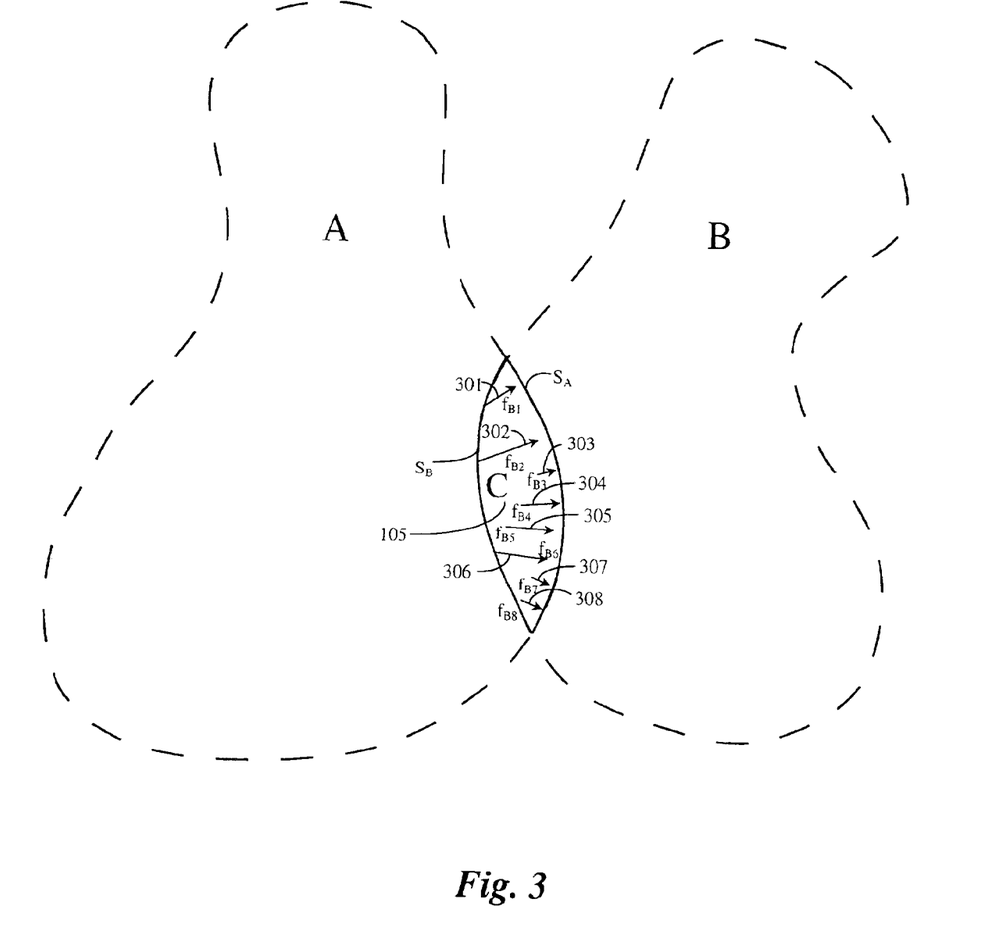
FIG. 3 is a diagram of force vectors in an overlap region of the two interacting bodies of FIGS. 2a and 2b.

As shown in FIG. 3, a force vector $F_B$ acting on object B due to penetration by object A is approximated by the sum of forces $f_{Bi}$ 301–308, so that $f_{Bi}=k_A(x_i)* \text{dist}_A(x_i)*g(x_i)$, where $k_A(x)$ is a material stiffness of A at x, $\text{dist}_A(x)$ is a closest distance from x to the surface of $S_A$ of A, and $g(x)$ is a normalized gradient vector of A's distance field at x.

The intersection ADF-C 105, according to the invention, represents the volumetric overlap region 131 to a high precision. Prior art penalty methods typically determine $F_A$ from a small number of points at the penetrating surface.

As an advantage of ADFs, penetration forces can be determined over the surface, or the entire volume of the overlap region. Forces can be determined at an arbitrary number of well-spaced sample points seeded on the surface, or throughout the entire volume. Because the distance field of each cell of an ADF is represented by an analytically defined field, it is also possible to analytically interpolate forces throughout the entire overlap region. These advantages of ADFs provide the opportunity to determine impact forces more accurately than prior art methods.

Determining Contact Deformation

On contact, the models can be deformed according to the forces. Various methods can be used to combine distance fields and achieve material dependent deformation, see Desbrun et al. "*Animating soft substances with implicit surfaces,*" Proc. SIGGRAPH'95, pp. 287–290, 1995, and Cani-Gascuel "*Layered deformable models with implicit surfaces,*" Proc. Graphics Interface'98, pp. 201–208, 1998.

Alternative Embodiments

Figure 4:
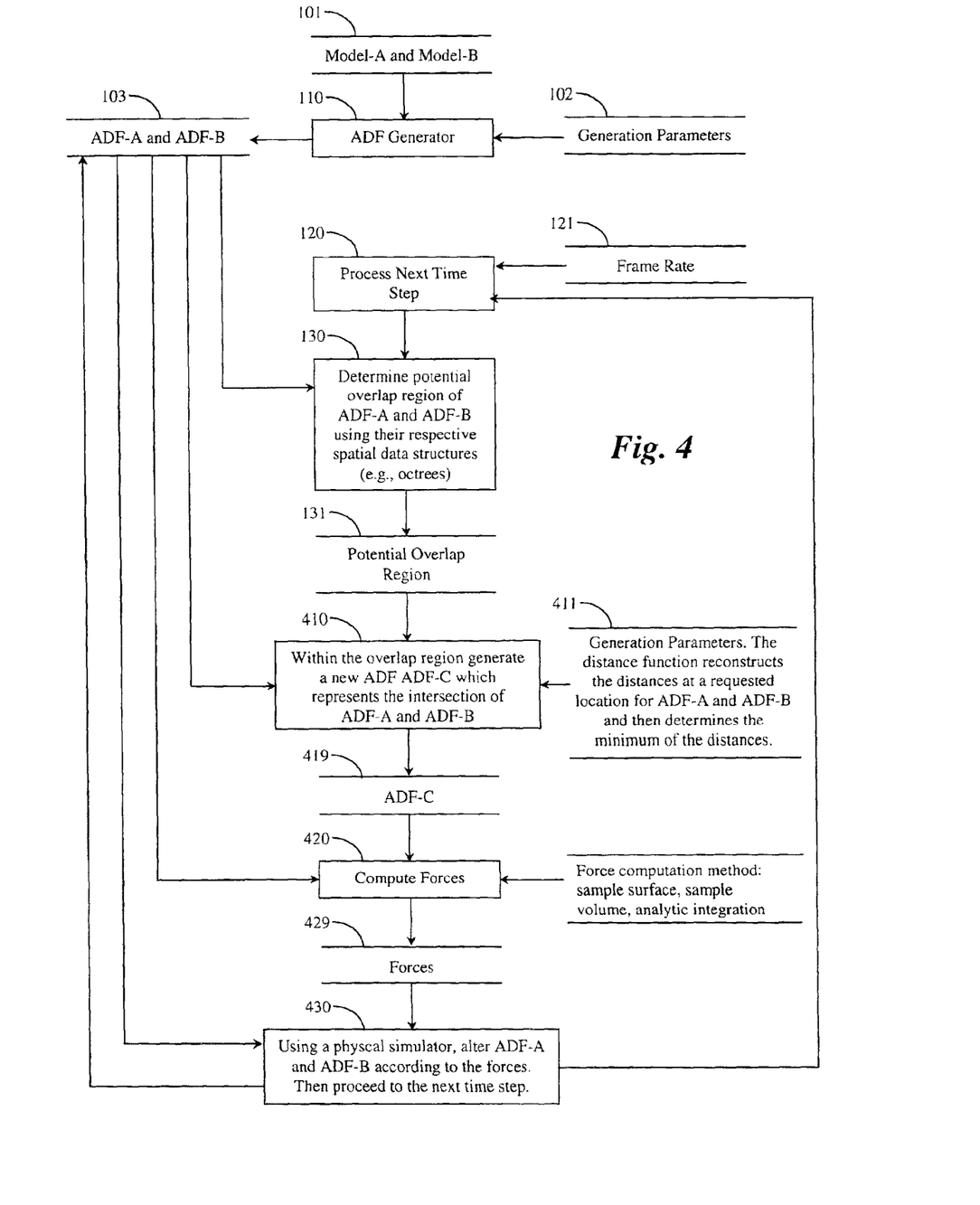
FIG. 4 is a flow diagram of modeling interactions between deformable objects using a physical simulator.
Figure 5:
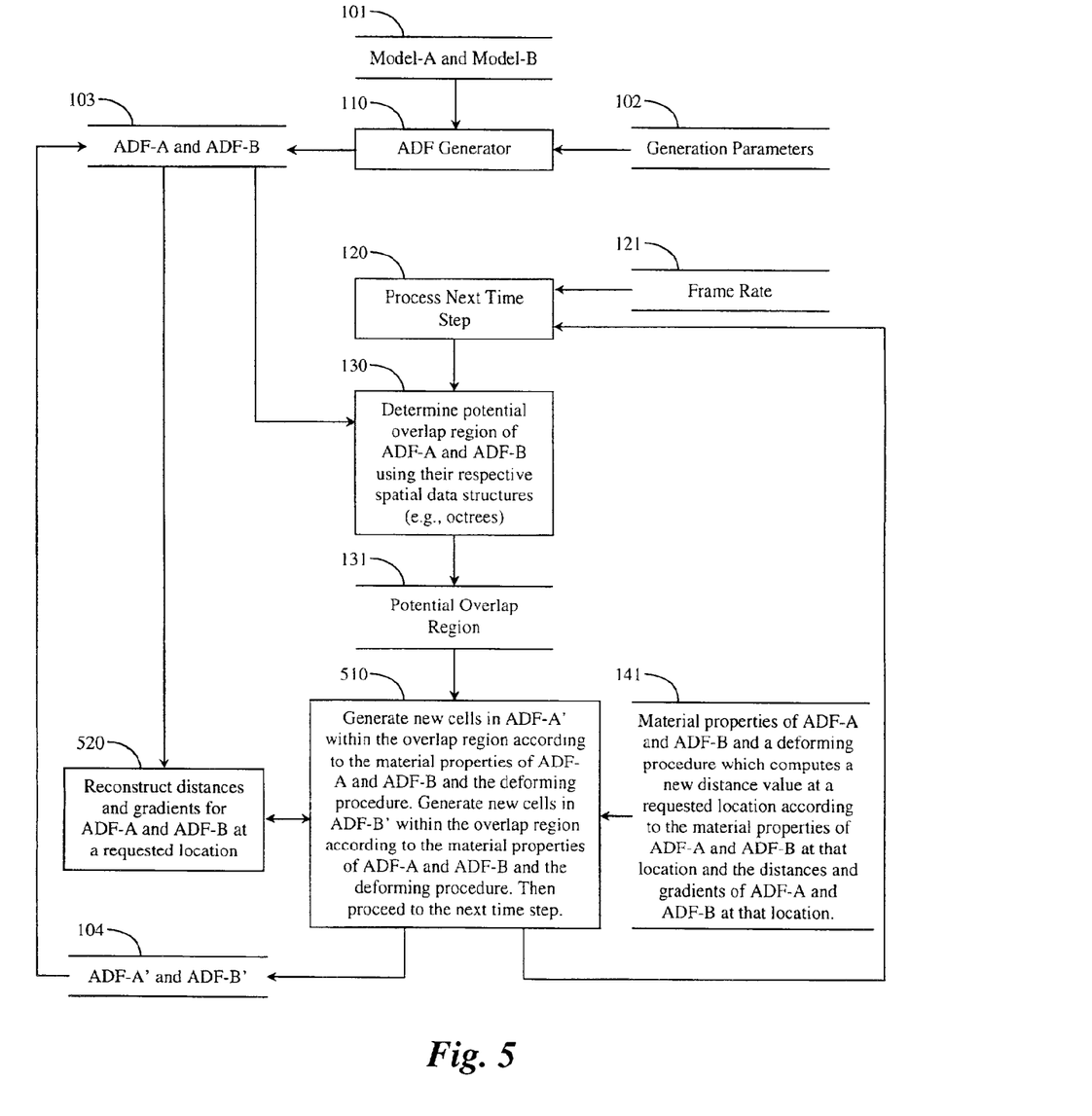
FIG. 5 is a flow diagram of modeling interactions between deformable objects using multiple adaptively sampled distance fields.
Figure 6:
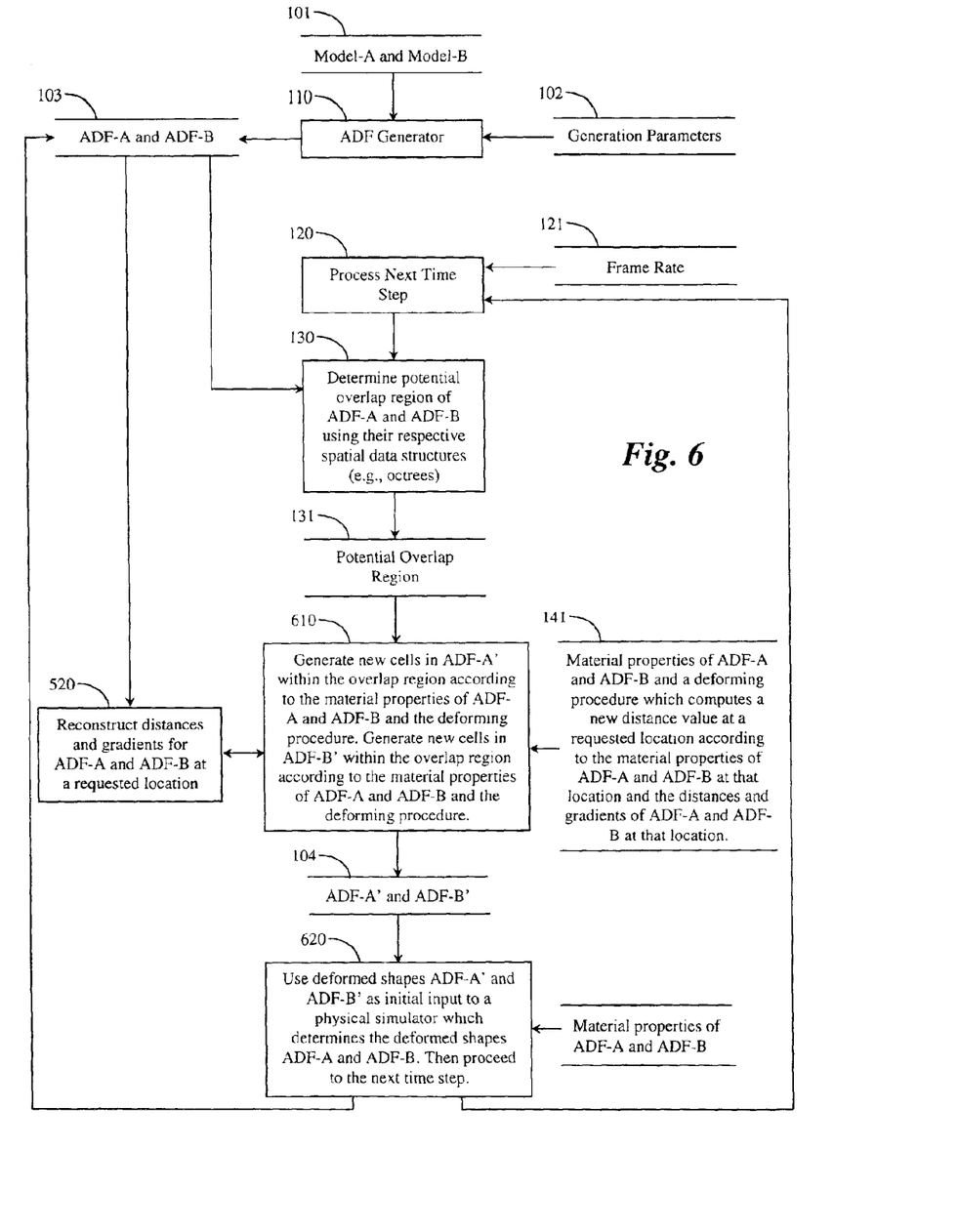
FIG. 6 is a flow diagram of modeling interactions between deformable objects using adaptively sampled distance fields and a physical simulator.

FIGS. 4, 5, and 6 show detailed embodiments for the interaction procedures 140, which compute forces and deform the ADFs 103 representing the models 101. As shown in FIG. 4, step 410 generates the ADF-C 419 representing the overlap regions 131 using generation parameters 411. The generation parameters include a distance function that reconstructs distance values in each of the ADFs 103, and then determines minimum distance values between the reconstructed distance values.

Step 420 computes forces 429 from the ADF-C 419 by surface sampling, volume sampling, or analytical integration of the interaction, e.g., material, properties, as described above. Then, a physical simulator 430 can be used to modify the ADF-A and ADF-B 103 according to the forces and proceed with the next time step 120.

As shown in FIG. 5, step 510 respectively generates new cells for ADF-A' and ADF-B' 104 according to the interaction properties 141, e.g., material properties, of ADF-A and ADF-B 103 and the deformation procedure. The deformation procedure determines new distance values at specified location using the original distance values and gradients of the distance field. Step 520 constructs ADF-A' and ADF-B' 104 at requested locations to reflect the deformation, and proceeds with the next time step 120.

As shown in FIG. 6, step 610 respectively generates new cells in ADF-A' and ADF-B' according to the material properties 141 of ADF-A and ADF-B and the deformation procedure. The deformation procedure determines new distance values at specified location using the original distance values and gradients of the distance field. In step 620, the deformed shapes of ADF-A' and ADF-B' 104 are input as initial deformations to a physical simulator 620 to speed up the processing. The physical simulator 620 then produces the deformed ADFs 103 and proceeds with the next time step 120.

This invention is described using specific terms and examples. It is to be understood that various other adaptations and modifications may be made within the spirit and scope of the invention. Therefore, it is the object of the appended claims to cover all such variations and modifications as come within the true spirit and scope of the invention.

What is claimed is:

1. A computer implemented method for modeling interactions between a plurality of deformable graphical objects represented by models, comprising:

generating a first adaptively sampled distance field having a first spatial hierarchy for a first model representing a first deformable graphical object, and generating a second adaptively sampled distance field having a second spatial hierarchy for a second model representing a second deformable graphical object;

determining a potential overlap region between the first and second deformable graphical objects, during a time step, using the spatial hierarchies of the first and second adaptively sampled distance fields; and generating, only when the potential overlap region is non-empty, a third adaptively sampled distance field from the first and second adaptively sampled distance fields using a first interaction procedure and first properties, the third adaptively sampled distance field representing a result of the first graphical object interacting with the second deformable graphical object, and generating a fourth adaptively sampled distance field from the first and second adaptively distance fields using a second interaction procedure and second properties, the fourth adaptively sampled distance field representing a result of the second deformable graphical object interacting with the first deformable graphical object, to model the interactions between the first and second deformable graphical objects.

2. The method of claim 1 wherein the interaction procedures are identity procedures representing an intersection between the first and second deformable graphical objects, and further comprising:

generating an intersection adaptively sampled distance field, the intersection adaptively sampled distance field representing the overlap region between the first and second deformable graphical objects.

3. The method of claim 2 further comprising:

determining interaction forces between the first and second deformable graphic objects from the fifth adaptively sampled distance field.

4. The method of claim 2 further comprising:

sampling surface cells of the fifth adaptively sampled distance field to determine impact forces at a surface of the fifth adaptively sampled distance field.

5. The method of claim 2 wherein the fifth adaptively sampled distance field represents a volume of the overlap region between the first and second deformable graphic objects, and further comprising:

sampling the volume of the fifth adaptively sampled field to determine impact forces throughout the volume where the first and second deformable graphic object intersect.

6. The method of claim 5 further comprising:

determining impact forces at a surface of the volume by analytic means.

7. The method of claim 5 further comprising:

determining impact forces throughout the volume by analytic means.

8. The method of claim 2 further comprising:

determining a force vector $F_B$ acting on the fourth adaptively distance field due to the penetration of the third adaptively distance field by the fourth adaptively distance field by the sum of forces $f_{Bi}=k_A(x_i)*dist_A(x_i)*g_A(x_i)$, where $k_A(x)$ is a material stiffness of the third adaptively distance field at x, $dist_A(x)$ is a closest distance from x to the surface of the third adaptively distance field, and $g_A(x)$ is a normalized gradient vector of the third adaptively distance field at x; and determining a force vector $F_A$ acting on the third adaptively distance field due to the penetration of the fourth adaptively distance field by the third adaptively distance field by the sum of forces $f_{Ai}=k_B(x_i)*dist_B(x_i)*g_B(x_i)$, where $k_B(x)$ is a material stiffness of the fourth adaptively distance field at x, $dist_B(x)$ is a closest distance from x to the surface of the fourth adaptively distance field, and $g_B(x)$ is a normalized gradient vector of the fourth adaptively distance field at x.

9. The method of claim 8 wherein $k_A$ and $k_B$ are identical.

10. The method of claim 8 wherein $k_A$ and $k_B$ are different.

11. The method of claim 8 wherein the deformation due to the force vectors $F_A$ and $F_B$ are volume preserving.

12. The method of claim 1 wherein the properties are material properties, and wherein the first interaction procedure is a deformation procedure for modeling a deformation of the first deformable graphic object according to the first material properties, and the second interaction procedure is a deformation procedure for modeling a deformation of the second deformable graphic object according to the second material properties.

13. The method of claim 12 wherein the deformation procedures combine distance values of the first and second adaptively sampled distance fields at a plurality of locations in the first and second adaptively sampled distance fields.

14. The method of claim 1 further comprising:

offsetting the first and second adaptively sampled distance fields to determine a relative proximity of the first and second deformable graphic objects.

15. The method of claim 1 wherein the time step depends on a frame rate to animate the interactions between the plurality of models.

16. A computer implemented method for modeling interactions between a plurality of deformable graphic objects, comprising:

generating a first adaptively sampled distance field having a first spatial hierarchy for a first model representing a first deformable graphic object, and generating a second adaptively sampled distance field having a second spatial hierarchy for a second model representing a second deformable graphic object; and determining a potential overlap region between the first and second graphical objects, during a time step, by comparing distance values stored in the spatial hierarchies of the first and second adaptively sampled distance fields.

17. The method of claim 16 wherein each spatial hierarchy includes surface cells at leaf nodes of each spatial hierarchy, and further comprising:

comparing distance values of the surface cells of the leaf nodes to determine an exact overlap region between the first and second graphical objects.

* * * * *